United States Patent [19]

Veth

[11] Patent Number: 4,610,238
[45] Date of Patent: Sep. 9, 1986

[54] HEADER ASSEMBLY FOR DEEP FAT FRYING COOKING SYSTEM

[75] Inventor: George J. Veth, Fairfield, Conn.

[73] Assignee: Food Automation-Service Techniques, Inc., Stratford, Conn.

[21] Appl. No.: 727,399

[22] Filed: Apr. 25, 1985

[51] Int. Cl.⁴ .................................................. A21B 1/00
[52] U.S. Cl. .................................. 126/21 R; 126/198; 361/383
[58] Field of Search ................ 126/351, 39 BA, 37 R, 126/21 R, 198, 374, 299 D; 219/401, 413, 414; 361/383

[56] References Cited

U.S. PATENT DOCUMENTS

| | | | |
|---|---|---|---|
| 2,237,795 | 4/1941 | Shroyer | 126/39 BA |
| 3,659,578 | 5/1972 | Davis et al. | 126/21 R |
| 3,779,228 | 12/1973 | Mizuno et al. | 126/21 R |
| 3,904,852 | 9/1975 | Rivelli et al. | 219/442 |
| 4,241,718 | 12/1980 | Barnett | 126/21 R |

OTHER PUBLICATIONS

Retrofit Assembly with Microprocessor Controlled Cooking Computer Food Automation-Service Techniques, Inc., Copyright (FAST) 1985.

Primary Examiner—Randall L. Green
Attorney, Agent, or Firm—Felfe & Lynch

[57] ABSTRACT

A header assembly for use in combination with a deep fat frying cooking device includes a casing having three external venting systems and two internal passageways associated therewith. Heated air from within an enlarged chamber surrounding the cooking kettles of the cooking device can flow upwardly through one of the internal passageways and the first venting system of the header assembly into the surrounding atmosphere external to the header assembly and the cooking device. As a result of this convention flow of heated air and the close proximity of the first venting system with the second venting system, cooling air from the exterior is drawn through the other internal passageway and the second and third venting systems. This cooling air serves to protect a heat-sensitive microprocessor controlled cooking computer, which extends partially into the second passageway, from being subject to temperatures above its maximum operating temperature.

9 Claims, 4 Drawing Figures

HEADER ASSEMBLY FOR DEEP FAT FRYING COOKING SYSTEM

BACKGROUND OF THE INVENTION

The present invention relates generally to cooking devices and more particularly to a header assembly for such cooking devices which mounts a microprocessor controlled cooking computer or other heat sensitive cooking controls for cooking foods to a predetermined level of doneness.

Conventional deep fat frying techniques have been used by restaurants, "fast-food" franchises and the like to prepare various fried food items such as french fried potatoes, fried chicken, breaded onion rings, fried fish filets, etc. Generally, these items are fried in deep fat frying devices having heated wells or kettles for holding the cooking shortening and a basket system for retaining the food items in the heated shortening during the cooking process.

In the highly competitive foodservice market, it is essential that the above-noted food items are cooked consistently to a predetermined level of doneness. To eliminate the guesswork involved such preparation, solid-state modular computerized cooking control computers such as that disclosed in U.S. Pat. No. 3,979,056 issued Sept. 7, 1976 have been developed by Food Automation-Service Techniques, Inc. located and doing business in Stratford, Conn. These computers use a temperature probe system such as that disclosed in U.S. Pat. No. 3,866,472 issued on Feb. 18, 1975 to analyze the variables (shortening temperature; fryer efficiency and capacity; quantity of product; quantity and condition of shortening; fryer recovery rate; product temperature and water content) associated with deep fat frying to control the cooking and determine when the produce is cooked to the desired amount of doneness. These computers reduce product waste, increase product yield and improve customer satisfaction.

One of the drawbacks of these cooking computers is their tendency to be adversely affected by the high temperature environment of the cooking device, i.e., the cooking kettles and shortening are operated at temperatures approaching four hundred and fifty degrees Fahrenheit which in turn raises the temperature of the fryer housing and the air therein. To protect the computers from these elevated temperatures, the computer modules have been mounted in dead air spaces and insulated from the cooking kettle and fryer housing as suggested by U.S. Pat. No. 3,904,852 issued on Sept. 9, 1975; however, the possibility remains that the temperature of the insulated computer module may increase above the maximum allowable ambient temperature of 160° F. thereby adversely affecting its temperature sensitive components. Operating temperatures lower than the maximum allowable temperature are desirable for long life of those components and reliability in their operation.

It is an object of the present invention to provide a novel header assembly for use in a deep fat frying cooking device to protect its microprocessor controlled cooking computer from the high temperature operating environment.

It is also an object to provide such an assembly which affords easy access to the control panel of the computer and allows the cooking computer to be removed for replacement or repair, if necessary.

Still another object is to provide such a header assembly which may be installed as original equipment or retrofitted to existing equipment.

A further object is to provide such a header assembly which may be readily and economically fabricated and will enjoy a long life in operation.

SUMMARY OF THE INVENTION

It has now been found that the foregoing and related objects can be readily attained in a combination of a header assembly with a cooking device having a generally rectangular hollow housing with at least one chamber therein.

The header assembly is provided with a casing defining an enclosure having an opening on one side thereof and further defining first, second and third vent systems therein, the first and second vent systems being spaced vertically from each other. The header assembly further includes a shield mounted within the enclosure of the casing and separating the enclosure into first and second passageways. A cooking computer control system is mounted on the casing and extends into the second passageway. The first vent system and the opening of the casing are in communication with the first passageway while the second and third vent systems are in communication with the second passageway thereof.

Desirably, the casing includes front and bottom sheet metal panels with the first and second vent systems defined in the front panel of the casing while the third vent system is defined in the bottom panel thereof. The casing also includes a computer mounting panel extending between the front and bottom panels of the casing and the computer control system has a microprocessor controlled cooking computer mounted within the computer mounting panel. The lead of the temperature probe unit of the cooking computer extends through an aperture in the shield and into the cooking device.

Ideally, a top panel of the casing provides an overhang to protect the computer and extends from the front panel at an acute angle thereto. The computer mounting panel extends from the front wall at an obtuse angle thereto and the shield is angled to extend upwardly from the bottom wall to the front wall.

The invention will be more fully understood when reference is made to the following detailed description taken in conjunction with the accompanying drawings.

DETAILED DESCRIPTION OF THE PREFERRED EMBODIMENT

Figure 1:
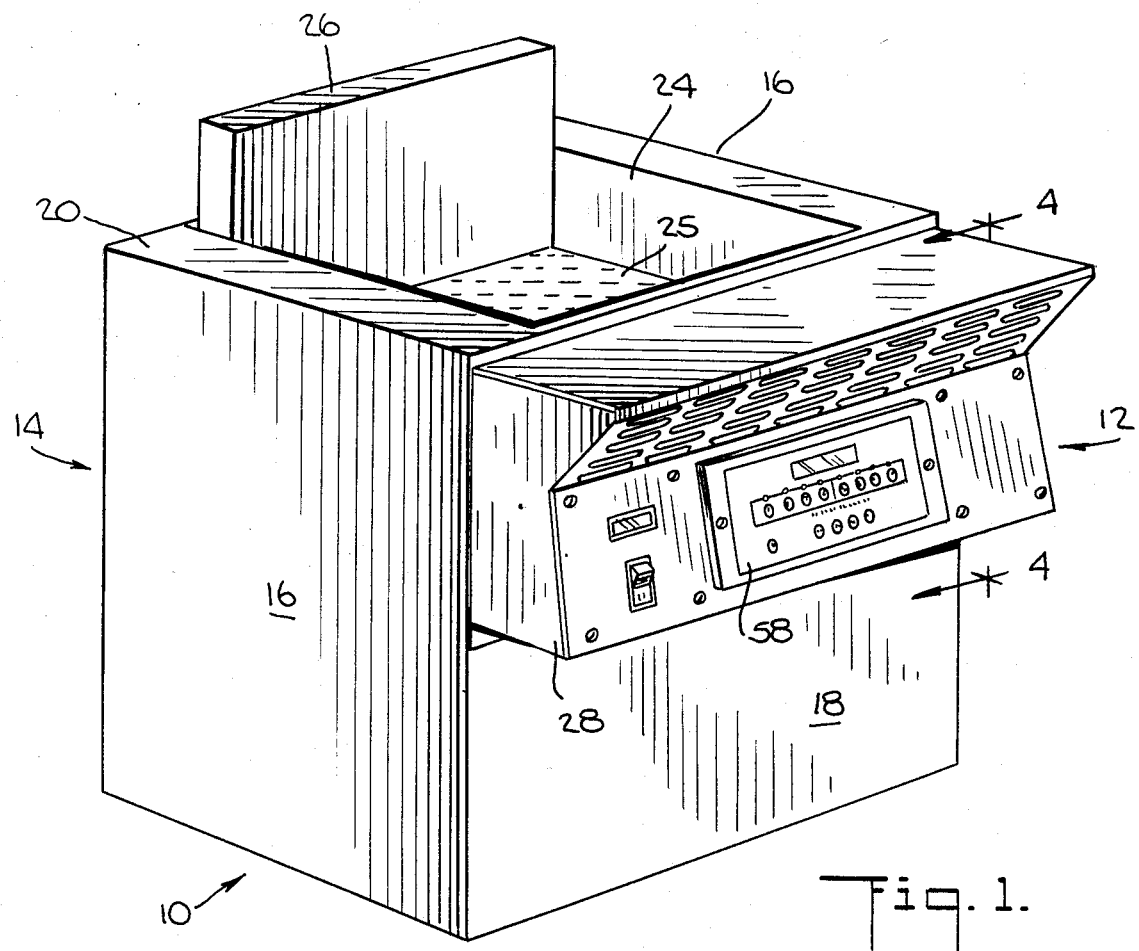
FIG. 1 is a perspective view of a deep fat frying cooking device including a header assembly embodying the present invention.

Referring first to FIG. 1, therein illustrated is a deep fat frying cooking device generally indicated by the numeral 10 and having a header assembly embodying the present invention and generally indicated by numeral 12.

The deep fat frying cooking device 10 includes a shell-like sheet metal housing 14 having a generally rectangular configuration and including a pair of side walls 16, a front wall 18, a top wall 20 and a rear wall (not shown). The housing 14 defines a large chamber 22 (FIG. 4) and has a heated kettle 24 mounted therein holding cooking shortening 25 for cooking fried foods in a manner well known in the art. Mounted on the back portion of the top wall is column member 26 which may be adapted to support a pair of independently vertically movable basket support hangers and their associated baskets (neither is shown in the drawings) as is well known in the art. The cooking device 10 can be any commercially available gas or electric cooking device such as those sold under the tradenames FRYMASTER, PITCO or VULCAN.

Figure 3:
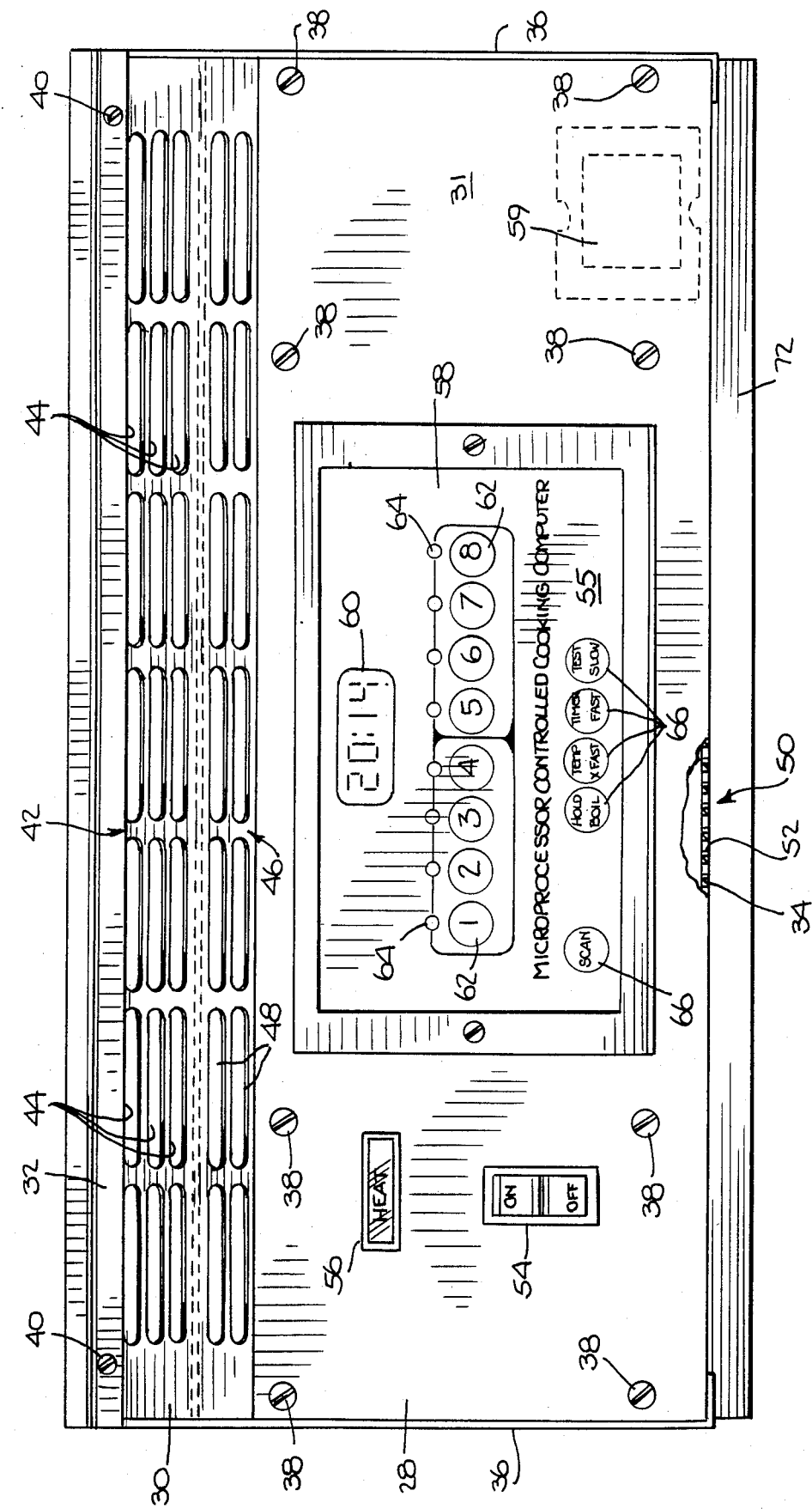
FIG. 3 is a front elevational view of the header assembly with a portion broken away to show internal structure.

Turning now to FIG. 3, the header assembly 12 is illustrated in greater detail. The assembly 12 has a sheet metal casing 28 having a generally rectangular configuration. The casing 28 is made up of an inclined front vent panel 30, an inclined computer mounting panel 31, a top panel 32, a bottom vent panel 34 and a pair of end caps 36. The elements 30, 34 and 36 are spot welded, riveted or otherwise secured together while the computer mounting panel 31 and the top panel 32 are releasably fastened to flanges on the front vent panel 30, bottom vent panel 34 and end caps 36 by fastening elements 38 and 40, respectively.

Extending transversely across the upper portion of the panel 28 is an upper or first vent system generally indicated by numeral 42 and having a multiplicity of juxtaposed sets of three elongated vent openings 44. Spaced below the first vent system 42 in the front panel 30 is an intermediate or second vent system generally indicated by numeral 46. The second vent system comprises a multiplicity of juxtaposed sets of two elongated vent openings 48 having configurations similar to vent openings 44.

Figure 2:
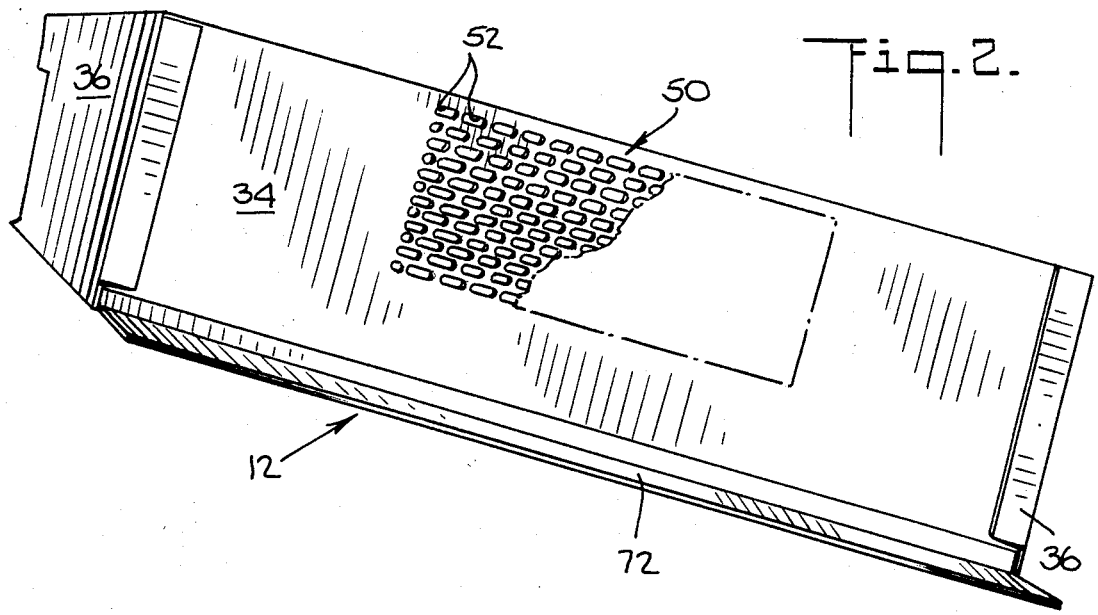
FIG. 2 is a bottom perspective view of the header assembly showing the third vent system in the bottom panel thereof.

The bottom vent panel 34 is provided with a lower or third vent system generally indicated by numeral 50 having a multiplicity of openings 52. As best seen in FIG. 2, the openings 52 of the third vent system 50 are arranged in rows forming a rectangular pattern in the bottom panel 34 of the casing 28. The pattern is equidistant from the end caps 36 but its longitudinal centerline is spaced slightly forward of the longitudinal centerline of the bottom panel 34.

Referring again to FIG. 3, the computer mounting panel 31 has an on/off switch 54, heat indicator light 56 and a microprocessor controlled cooking computer 58 mounted thereon. The on/off switch 54 offers manual control of the input of suitable electrical energy from a transformer 59 to the computer 58 by means of a suitable electrical connection (not shown). The heat indicator light 56 indicates the operating condition of the cooking device 10. The sheet metal casing 28 with its computer mounting panel 31 can be adapted to mount other electrical components (not shown) as may be necessary.

The cooking computer 58 can be any commercially available cooking computer. The computer illustrated is Model 821 manufactured and sold under the trademark FASTRON® by Food Automation-Service Techniques, Inc. located and doing business at 905 Honeyspot Road, Stratford, Conn. While the operation and structuring of this particular computer is not critical to the invention, these characteristics will be described briefly for the purposes of completeness.

Figure 4:
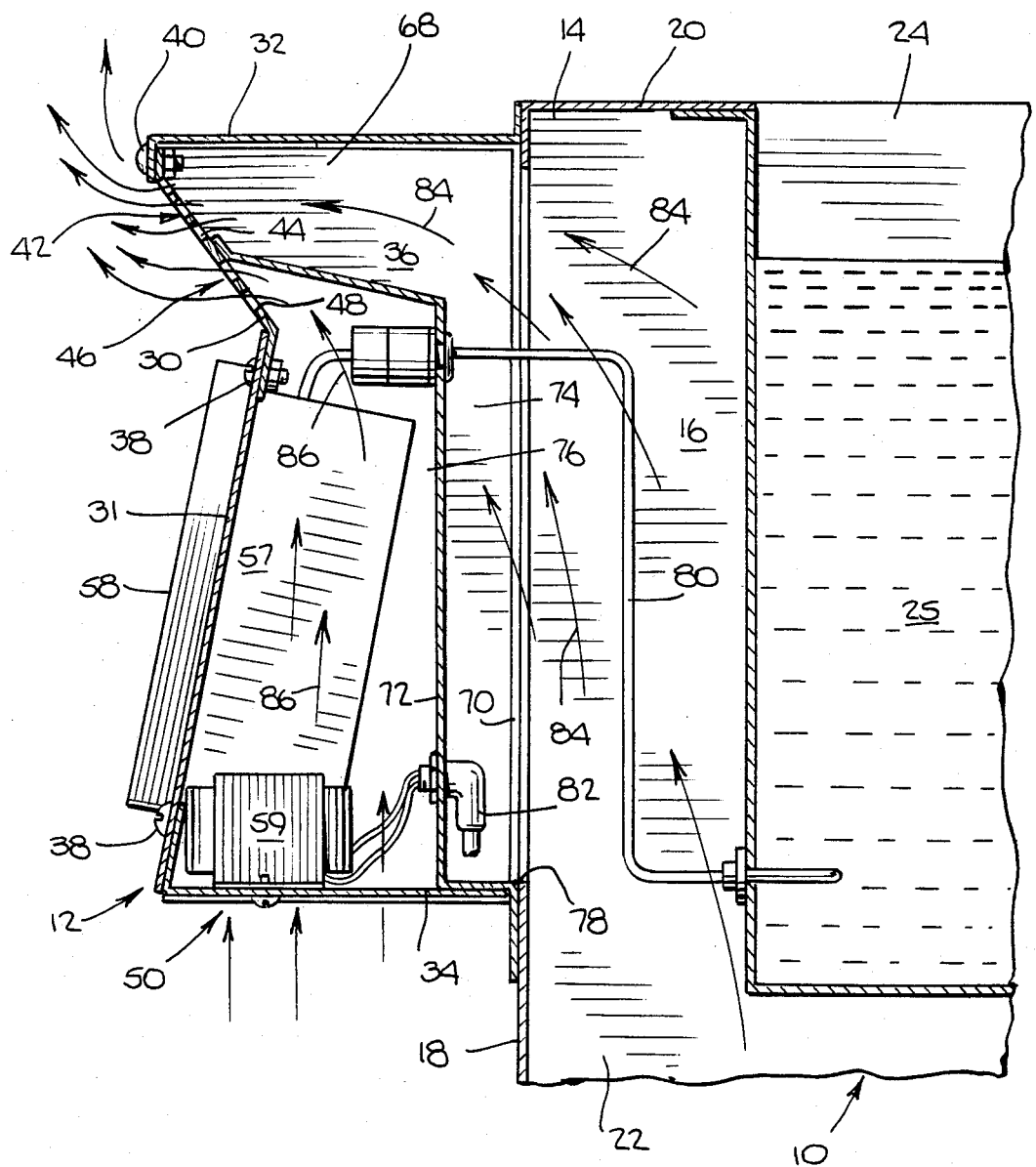
FIG. 4 is a fragmentary sectional view of the cooking device taken along the line 4—4 of FIG. 1.

The computer has a polycarbonate oil-resistant front face plate 55 and a brushed stainless steel chassis 59 (FIG. 4). The computer 58 is microprocessor controlled eight product computer and has an automatic light emitting diode time countdown display 60 which displays the time left in the cooking cycle in minutes and seconds. The display 60 also has the capability of displaying the temperature of the shortening and other operational signals.

Located below the display 60 are eight touch activated control selectors 62 (labelled 1-8) with their associated light emitting diode status indicators 64. The control selectors 62 are utilized by the operator to start/cancel cook cycles and to silence audible computer warning alarms. The individual status indicators 64 are illuminated when their associated control selectors 62 are activated. At bottom of the computer 58 are five touch actuated computer control keys 66 which facilitate the control and operation of the computer 58 by the user.

Turning now to FIG. 4, the top panel 32 of the header assembly 12 is secured to the inclined front vent panel 30 at an acute angle while the inclined computer mounting panel 31 is mounted to the front vent panel 30 at an obtuse angle. Accordingly, the front face of the panel 30 inclines downwardly while the front face of the panel 31 and, therefore, the computer 58 inclines upwardly to facilitate the viewing thereof by the operator. Furthermore, top panel 32 overhangs the computer 58 and protects it from heated shortening which may spill from the kettle due to cooking or handling of the food items.

As also seen in FIG. 4, the casing 28 of the header assembly 12 defines an enclosure 68 having an opening 70 on one side thereof. Mounted within the enclosure 68 between and spot welded to the bottom panel 34 and the front vent panel 30 is an angled sheet metal shield element 72. The shield 72 separates the enclosure 68 into two separate passageways 74 and 76. The first passageway 74 is in communication with the opening 70 and the first vent system 42 while the second passageway is in communication with the second and third vent systems 46 and 50.

The header assembly 12 is mounted on the front wall 18 of the cooking device 10 which has an opening 78 therein. The opening 78 in the front wall 18 is substantially coextensive with the opening 70 of the casing 28. Accordingly, the enlarged chamber 22 of the cooking device 10 is in communication with the first vent system 42 whereby air within the chamber 22 is provided with an exit to the exterior of the cooking device 10 and the header assembly 12 through the openings 70 and 78, the passageway 74 and the first vent system 42.

Extending from the kettle through the openings 70 and 78 and the shield 72 into the second passageway 76 to the computer 58 is a temperature probe unit 80 which senses the temperature of the cooking shortening 25. This information is relayed to the computer 58 for use during the cooking process. It should be noted that the chassis 57 of the computer 58 is mounted on the inclined mounting panel 31 and is disposed in the second passageway 76. In addition, it should be noted that a 115-volt electrical supply line 82 extends through the shield 72 and is electrically connected through the transformer 59 to supply power to the computer 58.

During normal operation, the shortening 25 in the kettle 24 is heated to cooking temperature, often 350° F. or higher, by a heating unit (not shown) within the chamber 22 adjacent to kettle. The heated kettle 24 and operation of the heating unit raises the temperature of the air within the large chamber 22 and creates convection air currents therein indicated by numeral 84. The heated air flows upwardly through the openings 70 and 78, the passageway 74 and the first vent system 42 to the exterior of the cooking device 10 and header assembly 12. This air flow 84 through the header assembly and out the upper vent system 42 draws air from the second passageway through the second and third venting systems 46, 50 creating a second air flow path designated by the numeral 86. This second air flow draws cool air from the exterior of the cooking device 10 and header assembly 12 past the cooking computer 58 thereby cooling the same and keeping the air temperature within the passageway below the maximum critical temperature of the computer 58. The second air flow 86 is also produced partially by heat generated by operation of the computer 57 and/or convection and radiation heating of the shield 72 from the air flow 84 and the heated kettle 24.

The header assembly can be modified to be mounted or commercially available ovens as will be recognized by those skilled in the art.

Thus, it can be seen from the foregoing detailed specification and attached drawing that the header assembly of the present invention decreases temperature of environment of the cooking computer, thereby improving the service life expectancy thereof.

The preferred embodiment described above admirably achieves the objects of the invention; however, it will be appreciated that departures can be made by those skilled in the art without departing from the spirit and scope of the invention which is limited only by the following claims.

I claim:

1. A combination of an assembly with a cooking device having a hollow housing with at least one chamber therein and with an opening in said chamber, comprising:

a casing defining an enclosure having an opening on one side thereof and further defining first, second and third vent means therein, said first and second vent means being spaced vertically from each other;

shield means mounted within said enclosure of said casing and separating said enclosure into first and second passageways, said first vent means and said opening of said casing being in communication with said first passageway; said second and third vent means being in communication with said second passageway thereof; and a cooking control system so mounted on said casing as to be accessible from outside said casing and extending into said second passageway whereby air within said chamber and heated by said cooking device can flow by means of convection air flow through said chamber and casing openings, said first passageway and said first vent means thereby drawing air through said second and third vent means and said second passageway past said cooking control system to cool the same.

2. The assembly in accordance with claim 1 wherein said casing includes front and bottom panels.

3. The assembly in accordance with claim 2 wherein said first and second vent means are defined in said front panel of said casing and said third vent means is defined in said bottom panel thereof.

4. The assembly in accordance with claim 3 wherein said second vent means is defined below said first vent means in said front panel.

5. The assembly in accordance with claim 2 wherein said casing includes a computer mounting panel extending between said front and bottom panels of said casing and said control system includes a microprocessor controlled cooking computer mounted within said computer mounting panel.

6. The assembly in accordance with claim 5 wherein said cooking computer has a temperature probe unit extending through an aperture in said shield means and into said cooking device.

7. The assembly in accordance with claim 2 wherein said front panel of said casing has upper and lower faces and said casing includes a top panel extending from said front panel at an acute angle to said upper face thereof.

8. The header assembly in accordance with claim 7 wherein said computer mounting panel extends from said front panel at an obtuse angle to said upper face thereof.

9. The assembly in accordance with claim 2 wherein said shield means is angled and extends upwardly from said bottom wall to said front panel.

* * * * *